May 29, 1934.   A. G. HOPKINS   1,960,673
RADIATOR COVER
Filed May 29, 1930   2 Sheets-Sheet 1
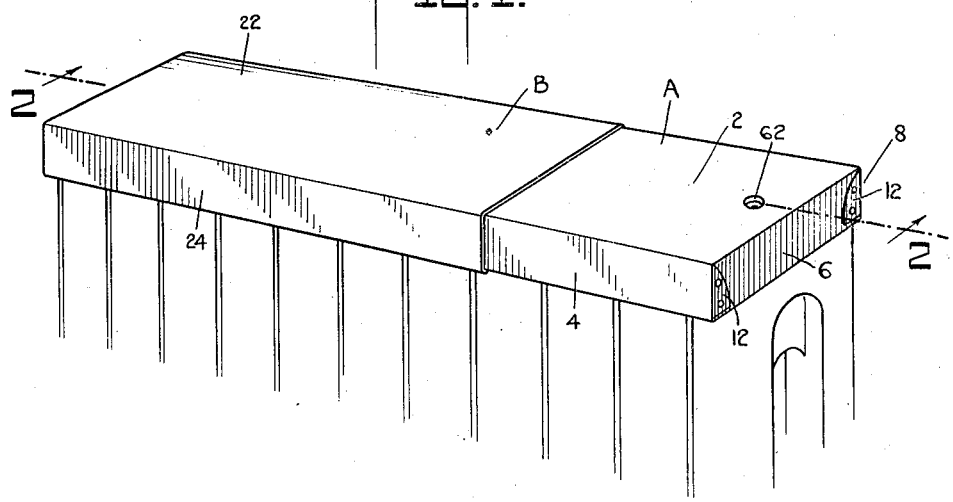
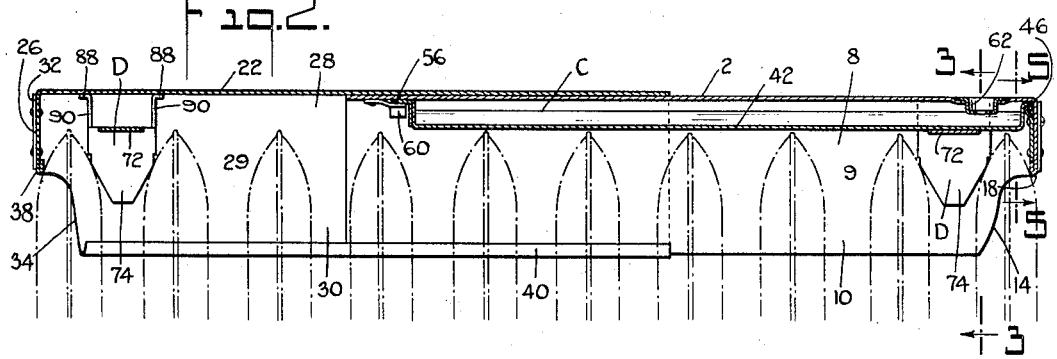
INVENTOR
Arthur G. Hopkins
BY
ATTORNEYS May 29, 1934.  A. G. HOPKINS  1,960,673
RADIATOR COVER
Filed May 29, 1930  2 Sheets-Sheet 2
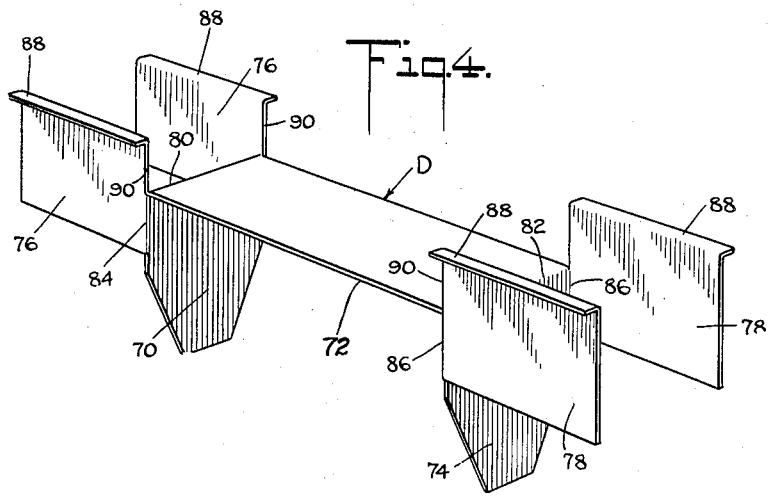
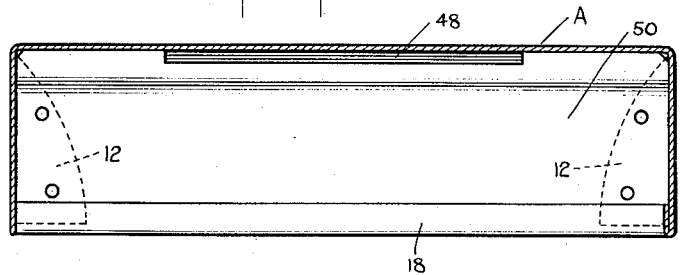
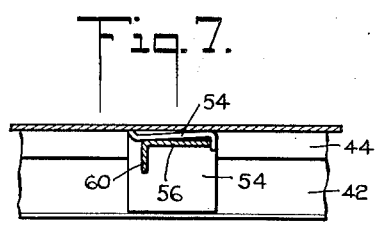
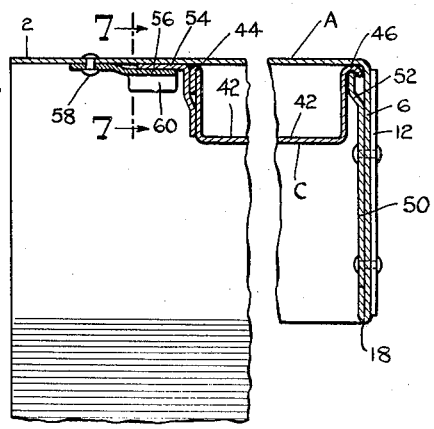
INVENTOR
Arthur G. Hopkins
BY
ATTORNEYS Patented May 29, 1934

1,960,673

UNITED STATES PATENT OFFICE 1,960,673

RADIATOR COVER

Arthur G. Hopkins, Maspeth, N. Y., assignor to Metal Package Corporation, New York, N. Y., a corporation of Delaware Application May 29, 1930, Serial No. 457,247

9 Claims. (Cl. 237—78)

This invention relates to radiator covers for steam or hot water radiators, and the like.

The object of the present invention, generally, resides in the provision of a simple, compact, economical radiator cover which will possess to an improved degree all of the usual advantages of such a device, such as the prevention of circulation of dust in the air stream, improvement in the appearance of the radiator, the ability to receive and support decorative articles, and so on.

Other objects of the present invention are to devise a radiator cover which will be readily adjustable in size so as to fit different radiators, and which will operate more efficiently to catch and retain dust and to direct the heated air forwardly through the radiator without interfering with the ready adjustability of the size of the cover.

Still further objects of the present invention center about supporting means for mounting and supporting the cover on top of the radiator, and lead to the following features and advantages:

These supporting means are so designed as to universally fit radiators of varying configuration including those with round and square tops; the supports are slidably adjustable within the cover so as to take the natural spacing of the sections of the radiator; this slidable adjustment of the supports within the cover is not affected by changes in the adjustment of the length of the cover; the supports may be made out of a single piece of sheet metal appropriately cut and bent to the desired form; the radiator cover is mounted on these supports, and the latter are located on the radiator without resorting to the use of screws or bolts and the like for fastening the parts together; and nevertheless the supports help make the radiator cover rigid, and the mounting of the assembly on the radiator is secure.

Other objects of the present invention center about the provision of humidifying means to prevent the air from being excessively dried by the radiator. Such objects are to conceal a water pan within the radiator cover; to make it possible to readily fill the pan and to determine the level of the water therein from outside of the radiator cover; to so mount the pan that it wil be readily detachable for inspection and cleaning or, if desired, to use the radiator cover without the water pan; and at the same time to so mount the pan that it will not interfere with adjustment of the size of the radiator cover, and in fact so that the cover may be completely telescoped, and handled in compact form for convenience of the retail trade.

Still further objects of my invention are to so design the supporting means that, in addition to the features and advantages as previously outlined, they will locate and center the water pan and directly support the same to prevent accidental tipping and spillage of water therefrom.

To the accomplishment of the foregoing and such other objects as will hereinafter appear, my invention consists in the radiator cover elements and their relation one to the other as hereinafter are more particularly described in the specification and sought to be defined in the claims. The specification is accompanied by drawings in which:

Fig. 1 is a perspective view showing a radiator cover embodying features of my invention;

Fig. 2 is a longitudinal section taken in elevation in the plane of the line 2—2 in Fig. 1;

Fig. 3 is a transverse section taken in the plane of the line 3—3 in Fig. 2;

Fig. 4 is a perspective view of one of the supporting means of the radiator cover;

Fig. 5 is a transverse section taken in the plane of the line 5—5 in Fig. 2;

Fig. 6 is a section showing a detail of the water pan mounting means; and

Fig. 7 is a section of a detail taken in the plane of the line 7—7 in Fig. 6.

Referring to the drawings, the radiator cover comprises, generally, inner and outer sections A and B arranged in telescopic relation, humidifying means C, and supporting means D.

Section A is made of sheet metal and is preferably formed out of a single piece of sheet metal by appropriately cutting and bending the same to form the top 2, front wall 4, end wall 6, and rear wall 9 which may be considered in two portions, a rear wall proper 8 and an apron or skirt 10, best shown in Figs. 2 and 3. The ends of the front and rear walls 4 and 8 are bent around the end wall 6 to form the laps 12 which are riveted to the end wall 6, as shown, to hold the section in shape.

The apron or skirt 10 is at the rear of the radiator cover and, therefore, is concealed from view. This concealment is made more certain by cutting away the end of the apron, as is indicated at 14 in Fig. 2, and this makes the apron invisible, as is indicated in Fig. 1. The function of the skirt or apron 10 is to close the space between the radiator and the wall and so to efficiently catch and prevent circulation of dust and dirt through the radiator and upwardly on the adjacent wall and ceiling. It also serves to deflect the heated stream of air outwardly through the front of the radiator and thus serves to improve the heating effect obtained therefrom.

The exposed edges of the radiator cover are bent or folded over to form protective folds, the fold on the forward edge being indicated at 16, and that on the edge of the end 6 being indicated at 18. No fold need be provided at the edge of the skirt 10 inasmuch as this edge is not exposed.

Section B is similarly preferably formed of a single sheet of metal patterned and bent to form the top wall 22, forward wall 24, end wall 26 and rear wall 29 comprising a rear wall proper 28 and a depending skirt or apron 30. The ends of the front and rear walls 24 and 28 are bent around the end wall 26 to form the laps 32 which are riveted to the end wall 26. The end of the skirt 30 is cut away, as at 34, to make the same symmetrical with the end 14 of the skirt 10. The exposed edge of the forward wall 24 is bent to form the protective fold 36; the exposed edge of the end wall 26 is bent to form the protective fold 38; and the lower edge of the rear wall 29 is bent to form the fold 40. The folds 36 and 40, however, are left relatively open so as to form grooves which receive the fold 16 and the lower edge of the apron 10 with a sliding fit, thereby permitting the sections A and B to telescope one within the other so as to fit different sizes of radiator, and to permit the radiator cover to be shipped and handled in a compact and convenient form.

The humidifying means C comprises a shallow, rectangular shaped water pan 42 which is supported beneath and concealed by the radiator cover, and, for reasons subsequently explained, preferably by the inner section A of the radiator cover. The water pan 42 may also be formed of a single piece of sheet metal appropriately cut to form bottom and side walls. The corners of the water pan are soldered to prevent leakage. The upper edges of the pan are folded downwardly to form a protective fold 44. At one end of the pan this fold is left relatively open to form a supporting hook 46 for cooperation with an appropriate notch or recess 52 formed within the radiator cover for receiving the same. This notch is preferably formed at the top edge of a piece of sheet metal 50, as is most clearly shown in Figs. 5 and 6, and this piece of sheet metal is attached against the end wall 6 above the fold 18 by means of the rivets which are anyway needed to attach the laps 12 to the wall 6. The upper edge of the piece of sheet metal 50 is bent inwardly or away from the wall 6, as shown at 52, in order to provide ample clearance for receiving the retaining hook 46 forming one end of the pan 42.

At the other end of the pan 42 a projecting lug or tab 54 is provided either integrally with the material of the pan or permanently attached thereto, as here illustrated. This tab is arranged for cooperation with a swivel latch 56 attached to the top 2 of section A by a rivet 58 and carrying a finger piece 60 bent downwardly from the latch and facilitating movement of the latch. To mount the pan in place it is merely necessary to engage the hook 46 in the notch or recess 48 and then to move the other end of the water pan to the top of the radiator cover and thereupon to swing the latch 56 until it rides over the tab 54 on the end of the pan. The tab 54 may be biased, as shown in Fig. 7, so as to retain the latch 56 in place.

The water pan 42 is preferably filled through a filler well 62 mounted in an aperture in the top of the radiator cover over the water pan. With this arrangement the water pan may be filled from outside of the radiator cover with any ordinary kitchen utensil such as a kettle, and the level of the water in the pan may be gauged by watching the level of the water in the well. The well is preferably made of such depth that the bottom is at the preferred water level so that water may be poured into the well until a trace of water appears in the bottom thereof.

With a telescopic radiator cover of the type here disclosed, the water pan 42 is preferably housed beneath and mounted in the inner section, in order not to interfere with the sliding movement of one section within the other. Thus, in the present case section A may be pushed entirely within section B, and the presence of the water pan 42 is of no consequence in connection with the desired telescopic action. With such an arrangement the filler well 62 is preferably located near the end of the section A so that it will be exposed and accessible for use if the radiator cover is extended from its closed position only slightly, as when used on a relatively small radiator. It will be observed that the water pan may readily be detached and removed from the radiator cover for inspection or cleaning and the like, and also that it may be removed and left entirely out of the radiator cover without interfering with the continued use of the latter.

The radiator cover is supported on a plurality of supporting means D, a preferred form of which is shown in perspective in Fig. 4. This member is made of sheet metal and is preferably formed from a single piece of sheet metal which is first cut to a shape comprising a longitudinal strip now shown at 70, 72 and 74, and transverse strips now shown at 76 and 78 spaced from the ends of the longitudinal strip 70, 72, 74. The end portion 70 of the longitudinal strip and the transverse portion 76 are bent downwardly along the fold line 80 at right angles to the longitudinal portion 72, and end portion 74 and transverse portion 78 are similarly bent downwardly along the fold line 82 at right angles to the longitudinal portion 72. The transverse portions 76 are then bent outwardly along the fold lines 84, while the transverse portions 78 are bent outwardly along the fold lines 86. The upper edges of the portions 76 and 78 may be folded downwardly to a horizontal position to form supporting faces or flanges 88 for receiving and supporting the top of the radiator cover. The end portions 70 and 74 are preferably tapered as shown, so as to form wedges which are adapted to enter the space between successive sections of the radiator on which the cover is to be mounted, regardless of the shape of the top of the radiator.

The manner in which the supporting means D is used is evident from Figs. 2 and 3 of the drawings. Fig. 2 shows how the wedge shaped depending ends 70 or 74 enter the spaces between successive radiator sections and rest on the upper ends of the sections. Fig. 3 shows how this mode of support is independent of the shape of the top of the radiator, and operates equally well with round or square topped radiators and similar variations. The overall length of the supporting members D is made almost exactly equal to the width of the radiator cover so as to prevent transverse movement of the latter on the supports, and at the same time to readily permit of sliding movement of the supports within the radiator cover along its length so as to accommodate changes in the length of the radiator cover, and differences in the distance between the sections or spaces between the sections of the radiator. In other words, the top and end edges of the members 76 and 78 nest accurately within the radiator cover and support the same over sufficient area to help make it rigid even though the attachment is entirely without screws or bolts and the like. The spacing between the depending wedges 70 and 74 is made considerably less than the length of the supporting member or the width of the radiator, so that these wedges will engage the radiator sections at the central portion thereof where they have sufficient body to receive and strongly support the same.

It should further be noted that the longitudinal portion 72 of the supporting unit D is spaced downwardly from the top of the supporting unit or flanges 88. This spacing is obtained simply by cutting the original sheet of metal between the transverse members 76 or 78, and the longitudinal strip 72, that is, along the edges 90, for a portion of the width of the transverse members 76 and 78 before bending and folding the metal to shape. The longitudinal strip 72 is spaced from the top of the radiator cover by an amount equal to the height of the water pan 42, and the length of the longitudinal member 72 is preferably made equal to the width of the water pan 42. With this proportioning of the dimensions it will be obvious that the water pan will be encompassed by the longitudinal member 72 and the inner edges 90 of the outwardly bent portions 76 and 78, and that the water pan will thereby be accurately located in place and supported independently of the support previously outlined.

It will also be recognized that the longitudinal adjustment of the supporting means within the cover and adjustment of the length of the cover are not interfered with by this double use of the supporting means for locating and supporting the radiator cover and for independently locating and supporting the water pan. Also, while two supporting means have here been shown, three or more may, if desired, be employed in order to better and more rigidly support the radiator cover, particularly if a long one is used. It will also be appreciated that when the water pan is supported by two of the supporting means D, the previously described latch mechanism for anchoring the water pan to the inner section of the radiator cover may, if desired, be dispensed with, although its use is preferably for the sake of convenience. On the other hand, it will be appreciated that the said latch mechanism may be relied upon for the sole support of the water pan and the supporting members D differently designed or dimensioned so as to support only the radiator cover per se. In either case, the arrangement should preferably embody the advantageous feature of the present arrangement which permits the cover to be telescoped, with the section A housed entirely within the section B, for the end of the water pan may slide above the longitudinal strip 72 and between the edges 90 of the supporting means D, while the top 2 of the section A, which is made of thin metal, may slide between the flanges 88 and the top 22 of the section B at either side of the water pan. If used on a very small radiator, it will be evident that both the water pan and the radiator cover will each be supported at both ends although only two of the supporting elements D are employed.

The mode of constructing, using, and the many advantages of my novel radiator cover will, it is believed, be apparent from the foregoing detailed description thereof. The radiator cover is readily adjustable in size, acts as an efficient dust catcher, and directs heat forwardly through the radiator. Humidifying means is provided but completely concealed, yet conveniently accessible for filling and for determining the water level therein, as well as removable when desired. The supporting means for the radiator cover act to definitely locate and rigidly support both the radiator cover and the water pan, and yet are universally applicable to different shapes and sizes of radiator. The entire radiator cover may be telescoped to compact size, which facilitates shipping and handling the same for commercial distribution and sales purposes. A minimum number of parts and of fastening means are employed, resulting in a structure which may be manufactured and marketed at a cheap price.

It will be apparent that while I have shown and described my invention in the preferred form, many changes and modifications may be made in the structure disclosed without departing from the spirit of the invention, defined in the following claims.

I claim:

1. A support for a radiator cover made out of a single piece of sheet metal cut to a shape comprising a longitudinal strip having tapered ends, and transverse strips spaced from the ends, the transverse and end portions being bent at right angles to the longitudinal strip, and the transverse portions being bent outwardly.

2. A support for a radiator cover made out of a single piece of sheet metal cut to a shape comprising a longitudinal strip having tapered ends, and transverse strips spaced from the ends, the transverse and end portions being bent at right angles to the longitudinal strip, and the transverse portions being bent outwardly to form supports for nesting within and supporting a radiator cover, the tapered ends being adapted to enter the space between successive radiator sections regardless of the shape of the top of the radiator.

3. A radiator cover comprising top and side walls, and a plurality of supporting means therefor each made of a single piece of sheet metal cut to a shape comprising a longitudinal strip having tapered ends and transverse strips spaced from the ends, the transverse and end portions being bent downwardly and the transverse portions being bent outwardly to form supports properly dimensioned to just slidably fit within the side walls and to bear against and support the top of said radiator cover, and the tapered ends being adapted to enter the space between successive radiator sections.

4. A radiator cover comprising two sections, each formed of sheet metal and arranged in telescopic relation in order to fit different sizes of radiator, each of said sections comprising top, end, front, and rear walls, the exposed edges of said sections being bent to form protective folds, the folds on the forward and rear edges of the outer section being left relatively open to form grooves for slidably receiving the inner section, and a plurality of supporting means therefor each made of a single sheet of metal cut to a shape comprising a longitudinal strip having tapered ends and transverse strips spaced from the ends, the transverse and end portions being bent downwardly and the transverse portions being bent outwardly to form supports properly dimensioned to just slidably fit within the forward and rear walls and to bear against and support the top of said radiator cover sections, and the tapered ends being adapted to enter the space between successive sections of a radiator on which the cover is to be placed.

5. A radiator cover, a shallow, rectangular shaped water pan narrower than said radiator cover and supported beneath and concealed by said radiator cover, mating means on said pan and cover for detachably locating the pan within the cover, and a plurality of supporting means each made of a single piece of sheet metal cut to a shape comprising a longitudinal strip having tapered ends and transverse strips spaced from the ends, the transverse and end portions being bent downwardly and the transverse portions being bent outwardly to form supports properly dimentioned to just fit within and support the top of said cover, the intermediate longitudinal portion and the inner edges of the transverse portions being properly dimensioned for encompassing and supporting the water pan, and the tapered ends being adapted to enter the space between successive radiator sections.

6. A radiator cover comprising two sections formed of sheet metal arranged in telescopic relation to fit different sizes of radiator, a shallow, rectangular water pan supported beneath and concealed by the radiator cover, and a plurality of supporting means for the radiator cover each made of a single piece of sheet metal having tapered ends bent downwardly to form supporting wedges adapted to enter the space between successive radiator sections and an intermediate portion so dimensioned as to directly support the water pan.

7. A radiator cover comprising two sections formed of sheet metal arranged in telescopic relation to fit different radiators, a shallow, rectangular water pan narrower than said radiator cover supported beneath and concealed by the inner section of said cover, mating means on said pan and said inner section for detachably holding the pan in place, and a plurality of supporting means each made of sheet metal cut and bent to form end portions properly dimensioned to just fit within and support said radiator cover, an intermediate portion supporting the water pan, and depending portions adapted to fit between and rest upon the radiator sections of the radiator to which the radiator cover is applied.

8. A radiator cover, an elongated water pan narrower than said radiator cover and supported beneath and concealed by said radiator cover, and a plurality of support means extending transversely of the radiator cover, each of said support means being made of sheet metal cut and bent to form raised end portions and an intermediate depressed or recessed portion between the raised end portions, said end portions being properly dimensioned to slidably fit and directly support the top of said radiator cover between the longitudinal side edges of the pan and the longitudinal side edges of the cover, and said intermediate portion being properly dimensioned for encompassing and independently supporting the water pan.

9. A radiator cover comprising two sections formed of sheet metal arranged in telescopic relation to fit different sizes of radiator, an elongated shallow water pan narrower than said radiator cover supported beneath and concealed by said radiator cover, and a plurality of support means extending transversely of the radiator cover, each of said support means being made of sheet metal cut and bent to form raised end portions and an intermediate depressed or recessed portion between the raised end portions, said end portions being properly dimensioned to just fit within and support the top of said radiator cover between the longitudinal side edges of the pan and the longitudinal side edges of the cover, and said intermediate portion being properly dimensioned for encompassing and independently supporting the water pan.

ARTHUR G. HOPKINS.